H. T. BASYE.
Bins for Preserving Sweet-Potatoes, &c.

No. 139,532. Patented June 3, 1873.

WITNESSES. INVENTOR.

UNITED STATES PATENT OFFICE.

HEDGEMON T. BASYE, OF DYERSBURG, TENNESSEE.

IMPROVEMENT IN BINS FOR PRESERVING SWEET POTATOES, &c.

Specification forming part of Letters Patent No. 139,532, dated June 3, 1873; application filed June 27, 1872.

*To all whom it may concern:*

Be it known that I, HEDGEMON T. BASYE, of Dyersburg, in the county of Dyer and State of Tennessee, have invented a new and useful Improvement in Bins for Preserving Sweet Potatoes, Fruit, and Vegetables, of which the following is a specification:

My present invention is an improvement upon the sweet-potato bin patented to me, December 13, 1870; and its object is to avoid certain disadvantages which experience has shown in the use of said bin, and chiefly among which was the retention of the moisture from the potatoes in the bin, and upon the straw which covered the potatoes, thus tending to keep the upper layer of the potatoes wet, which has been the great trouble and draw-back in preserving such articles properly, and which my improvement is designed to remedy by providing the open bin or crib with a surrounding gutter which also forms a seat for a removable cover, the edges whereof rest directly within the center of the gutter, so that the watery evaporation from the sweet potatoes will settle upon the under side of the cover, and pass down into the gutter to a receptacle, or outside, by pipes, whereby the moisture is prevented from gathering upon the straw which covers the potatoes, and thus they are kept dry, which is the essential requirement in their preservation when protected from the effects of severe cold weather. The removable cover serves simply as a surface for the condensation of the moisture and conductor thereof in connection with an open straw-covered bin containing the sweet potatoes, and from which the moisture rises freely and is caught and held by the cover, which, however, does not fit closely upon the bin or crib, but leaves an open space between them for the freed moisture to rise and pass out.

Figure 1:
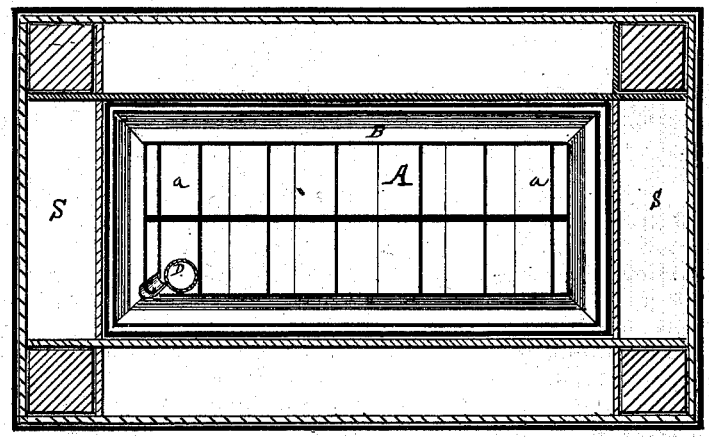
Figure 2:
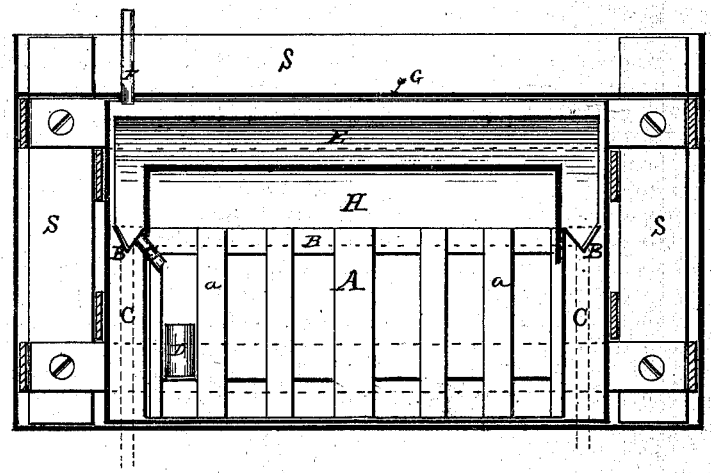

In the accompanying drawings, Figure 1, represents a horizontal section of a bin embracing my improvement with the inner cover of the crib removed; and Fig 2, a vertical longitudinal section of the bin.

The bin is composed of a double case, S S, built up of boards with an intervening chamber for any suitable non-conducting materials. Said chamber may or may not extend beneath the inner case, but surrounds its sides and ends. Within the compartment is placed the receiving-bin A, open at the top and provided with a gutter, B, surrounding its outer sides for the purpose of forming a seat for the cover E, of the bin A, and to collect the water which condenses from the moisture given out from the potatoes. The cover is concave or hip-roofed, and its lower edges rest in the center of the gutter, and as the moisture rises from the sweet potatoes it adheres to the cover, and runs down into the gutter and passes off by a spout, C, into a bucket D, or by pipes through the bottom of the bin. The top of the inner bin or crib A, is open and a space, H, is left between it and the cover to leave free outlet from the bin for the moisture to collect upon the cover. This cover E is made removable for access to the bin A, and being fitted to rest in the gutter B it can be easily taken out and put in place when required. The moist vapor not condensed will pass out of the pipe F, in the outer cover G, into the air. This cover forms the top of the non-conducting bin, and is covered with straw and earth, and it is removed when access to the inner bin is required.

In using the bin, the sweet potatoes should be put in as soon as they are dug, the bin surrounded with earth, and sheltered from rain. The bottom of the inner bin or crib A, is covered with straw, shucks, or hay, and the top of the potatoes also covered. In my patent aforesaid, the straw-covering would collect the moisture and hold it, thus rotting the potatoes very soon, but the collecting-cover E, and gutter B, keeps the straw and air dry, and the sweet potatoes sound; for it is well known that potatoes heat and throw off moisture when kept close, and if this moist vapor can be collected the potatoes will be prevented from rotting; and this is the thing which my improvement effects.

Having described my invention, I claim—

In a bin for preserving sweet potatoes, the inner open-top crib or bin A, with an outside surrounding gutter B, in combination with a cover E, fitted to rest in said gutter and with a space, H, intervening between the cover and the straw-covered potatoes, as shown, and for the purpose described.

HEDGEMON T. BASYE.

Witnesses:
FRANKLIN BARRITT,
RICHARD GERNER.